Sept. 28, 1926.

C. H. HATHAWAY ET AL 1,601,441

AUTOMOBILE BUMPER

Original Filed Dec. 8, 1923

INVENTORS
CHARLES H. HATHAWAY
WILLIAM A. STARCK

By: Edwin B. H. Tower Jr. ATTY.

Patented Sept. 28, 1926.

1,601,441

UNITED STATES PATENT OFFICE.

CHARLES H. HATHAWAY AND WILLIAM A. STARCK, OF MILWAUKEE, WISCONSIN, ASSIGNORS TO BADGER MANUFACTURING CORPORATION, OF MILWAUKEE, WISCONSIN, A CORPORATION OF DELAWARE.

AUTOMOBILE BUMPER.

Continuation of application Serial No. 679,366, filed December 8, 1923. This application filed March 29, 1926. Serial No. 98,073.

This invention relates to an automobile bumper.

The bumper to which the invention particularly applies has parallel spring front bars for receiving the impact in a collision and absorbing the same.

The object of the invention is to provide the front bars with a spring support at each end to increase the capacity thereof to resist an impact.

Another object thereof is to provide a spring bar bumper which is simple and efficient, and which may be readily and economically manufactured.

In accordance with the present invention, the spring front bars are supported at each end by a separate spring supporting bar which has its outer end pivotally connected to the ends of the front bars and its inner end connected to the front bars between the ends and the central part thereof.

This application is a continuation of application Serial No. 679,366, filed December 8, 1923, as to all matter common to both applications.

The accompanying drawing illustrates bumpers embodying the invention, and the views therein are as follows.

Figure 1:
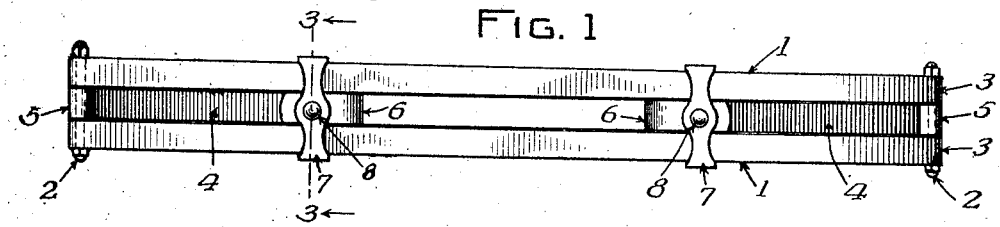
Fig. 1 is a front view of a double bar bumper.
Figure 2:
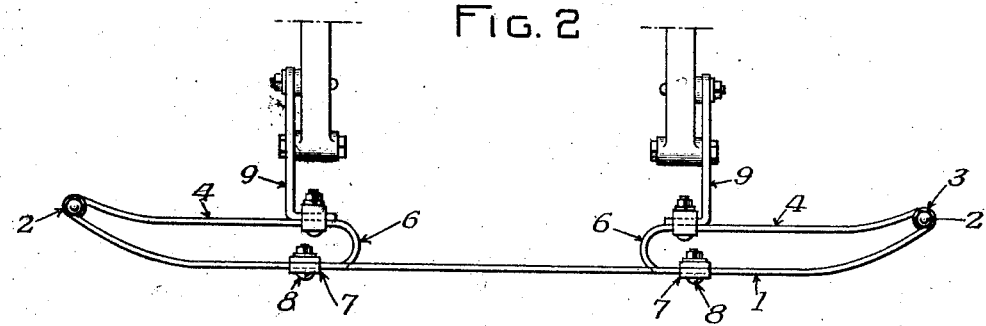
Fig. 2 is a plan view thereof.
Figure 3:
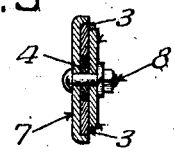
Fig. 3 is a sectional view on the line 3—3 of Fig. 1.
Figure 4:
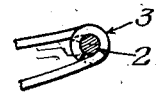
Fig. 4 is a sectional view through the pivot pin above the top front bar.

The double bar bumper illustrated in Figs. 1 to 4 is provided with two parallel spring front bars 1 which are connected at each end by a pivot pin or pintle 2.

They have formed on the ends thereof closed rings or sleeves 3 which receive the pivot pins.

The front bars are supported at each end by a spring supporting bar 4 which has its outer end connected to the pivot pin between the front bars.

This outer end has formed thereon a closed ring or sleeve 5 which receives the pivot pin.

The pivot pin pivotally connects the front bars and the supporting bar and holds them in position in relation to each other.

The supporting bar has a looped or reverted inner end 6 which is connected to the front bars by a clamp arranged between the end and the central part of the front bars.

This clamp has plates 7 which receive between them the front bars and the reverted inner end of the supporting bar, and they are held together by a bolt 8 which passes through said reverted inner end.

The spring supporting bar is provided with a suitable bracket 9 for attaching the bumper to an automobile frame, and this bracket is connected to the supporting bar intermediate its ends.

The spring supporting bars, in addition to supporting the front bars in a rigid vertical position, resiliently brace them laterally at their ends, and also intermediate the ends and the central part thereof, and thereby substantially increase their capacity to resist an impact anywhere along the same.

If the front bars receive a central impact, they will spring or bend backward between the looped inner ends of the supporting bars and that will cause their ends to have a forward movement which will be resisted by the outer ends of the supporting bars.

Accordingly, the capacity of the central part of the front bars to resist the central impact will be increased by the action of the outer ends of the supporting bar.

Figure 5:
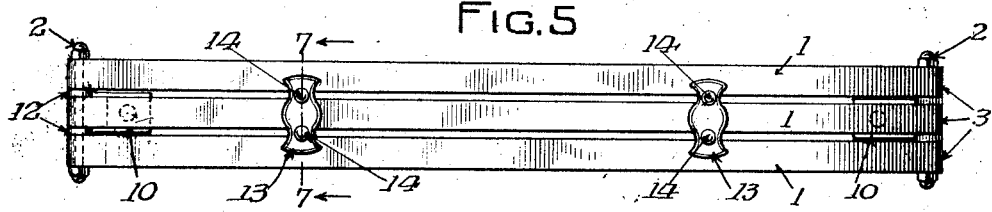
Fig. 5 is a front view of a triple bar bumper.
Figure 6:
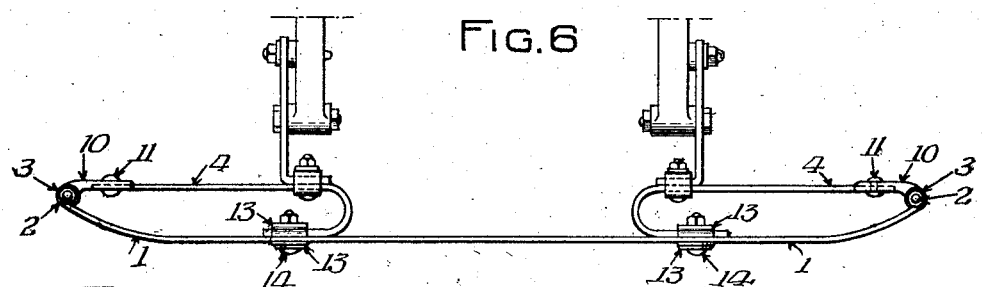
Fig. 6 is a plan view of this triple bar bumper.
Figure 7:
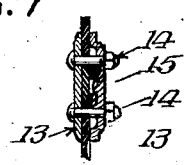
Fig. 7 is a sectional view on the line 7—7 of Fig. 5.
Figure 8:
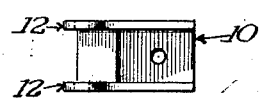
Fig. 8 is a separate view of the plate for connecting the supporting bar to the pivot pin in the triple bar bumper.

The triple bar bumper illustrated in Figs. 5 to 8 has the same general characteristics as the double bar bumper.

The parts thereof which correspond to those heretofore described are designated by the same reference numerals.

Its three front bars 1 are connected to the pins 2, and they are supported at each end by the supporting bar 4, which is provided with a plate 10 for connecting it to the pivot pin.

This plate is fastened to the supporting bar by a rivet 11, and it has two closed rings 12 which sit between the front bars and surround the pivot pin.

The clamp which connects the inner looped end of the supporting bar to the front bars is provided with two plates 13 and two bolts 14 to hold these plates together.

The rear plate is provided with a recess to receive the supporting bar, and it has formed thereon a stud or projection 15 which enters a recess or hole in the supporting bar.

Of course, various bumpers may be devised which will embody the invention herein set forth and defined in the claims hereof.

The invention claimed is as follows:

1. An automobile bumper, comprising a spring front bar, and a separate spring supporting bar pivotally connected to each end thereof and having its inner end independently connected to said front bar intermediate the end and the central part thereof.

2. An automobile bumper, comprising a spring front bar, a separate spring supporting bar pivotally connected to each end thereof and having its inner end independently connected to said front bar intermediate the end and the central part thereof, and a bracket connected to the supporting bar intermediate its ends.

3. An automobile bumper, comprising a spring front bar, and a separate spring supporting bar having its inner end looped and independently connected to said front bar intermediate its end and the central part thereof.

4. An automobile bumper, comprising a spring front bar, a separate spring supporting bar having its inner end looped and independently connected to said front bar intermediate its end and the central part thereof, and a bracket connected to each supporting bar intermediate its ends.

5. An automobile bumper, comprising parallel spring front bars, and a separate spring supporting bar pivotally connected thereto at each end thereof and having its inner end independently connected to said front bars intermediate the end and the central part thereof.

6. An automobile bumper, comprising parallel spring front bars, a separate spring supporting bar pivotally connected thereto at each end thereof and having its inner end independently connected to said front bars intermediate the end and the central part thereof, and a bracket connected to each supporting bar intermediate its ends.

7. An automobile bumper, comprising parallel spring front bars, and a separate spring supporting bar pivotally connected thereto at each end thereof and having its inner end looped and independently connected to said front bars intermediate the end and the central part thereof.

8. An automobile bumper, comprising parallel spring front bars, a separate spring supporting bar pivotally connected thereto at each end thereof and having its inner end looped and independently connected to said front bars intermediate the end and the central part thereof, and a bracket connected to the supporting bar intermediate its ends.

9. An automobile bumper, comprising parallel spring front bars, and two separate spring supporting bars having their outer ends pivotally connected to said front bars and having their inner ends independently connected to said front bars on opposite sides the central part thereof.

10. An automobile bumper, comprising parallel spring front bars, and two separate spring supporting bars having their outer ends pivotally connected to said front bars and their inner ends looped and independently connected to said front bars on opposite sides the central part thereof.

11. An automobile bumper, comprising parallel spring front bars, two separate spring supporting bars having their outer ends pivotally connected to said front bars and their inner ends looped and independently connected to said front bars on opposite sides the central part thereof, and a bracket connected to each supporting bar intermediate its ends.

12. An automobile bumper, comprising parallel spring front bars having closed rings formed on the ends thereof, two spring supporting bars having closed rings formed on the outer ends thereof, pins passing through said rings to pivotally connect said front bars and supporting bars together, and means connecting the inner ends of said supporting bars to said front bars on opposite sides the central part thereof.

13. An automobile bumper, comprising parallel spring front bars having closed rings formed on the ends thereof, two spring supporting bars having closed rings formed on the outer ends thereof, pins passing through said rings to pivotally connect said front bars and supporting bars together, means connecting the inner ends of said supporting bars to said front bars on opposite sides the central part thereof, and a bracket connected to each supporting bar intermediate its ends.

14. An automobile bumper, comprising parallel spring front bars, and two separate spring supporting bars pivotally connected to the ends of said front bars and having the inner ends thereof looped and independently connected to said front bars on opposite sides the central part thereof.

15. An automobile bumper, comprising parallel spring front bars, two separate spring supporting bars each having its outer end pivotally connected to the end of said front bars by a pin passing through closed rings formed on said front bars and said supporting bars, an inner looped end formed on said supporting bars, and a clamp connecting said looped ends to said front bars intermediate the ends and the central part thereof.

16. An automobile bumper, comprising parallel spring front bars, two separate spring supporting bars each having its outer end pivotally connected to the end of said front bars by a pin passing through closed rings formed on said front bars and said supporting bars, an inner looped end formed on said supporting bars, a clamp connecting said looped end to said front bars intermediate the ends and the central part thereof, and a bracket connected to each supporting bar intermediate its ends.

17. An automobile bumper, comprising two parallel spring front bars, and two separate spring supporting bars arranged between said front bars, each having its outer end pivotally connected to the end of said front bars by a pin and its inner end looped and connected to said front bars by a clamp arranged intermediate the end and the central part thereof.

18. An automobile bumper, comprising parallel spring front bars, and two separate spring supporting bars each having its outer end pivotally connected to said front bars by a pivot pin and its inner end looped and connected to said front bars by a clamp arranged intermediate the end and the central part thereof.

19. An automobile bumper, comprising two parallel spring front bars, two separate spring supporting bars arranged between said front bars, each having its outer end pivotally connected to the end of said front bars by a pin and its inner end looped and connected to said front bars by a clamp arranged intermediate the end and the central part thereof, and a bracket connected to each supporting bar intermediate its ends.

20. An automobile bumper, comprising parallel spring front bars, two separate spring supporting bars each having its outer end pivotally connected to said front bars by a pivot pin and its inner end looped and connected to said front bars by a clamp arranged intermediate the end and the central part thereof, and a bracket connected to each supporting bar intermediate its ends.

21. An automobile bumper, comprising parallel spring front bars, pivot pins connecting the ends thereof, a spring supporting bar connected to each pivot pin and having a looped inner end, and a clamp connecting said looped inner end to said front bars intermediate the end and the central part thereof.

22. An automobile bumper, comprising parallel spring front bars, pivot pins connecting the ends thereof, a spring supporting bar connected to each pivot pin and having a looped inner end, a clamp connecting said looped inner end to said front bar intermediate the end and the central part thereof, and a bracket connected to each supporting bar intermediate its ends.

23. A bumper comprising an attaching means, an impact member and two substantially U shaped springs, each having two arms, one of which is longer than the other, the longer arm having the attaching means secured thereto and extending on opposite sides of said attaching means and said longer arm being secured to the impact member adjacent the end of the latter and the shorter arm being secured to the impact member at a point between the end of the latter and the center of said impact member.

24. A bumper comprising an impact member, attaching means, and means for supporting said bumper from the attaching means, said supporting means embodying an arm extending outwardly from the attaching means and connected with the impact member adjacent its end and an arm extending outwardly in advance of the first mentioned arm from a point on the inner side of the attaching means and connected with the impact member between an end and the center of said impact member.

CHARLES H. HATHAWAY.
WILLIAM A. STARCK.